US011829460B2

(12) United States Patent
Vargas et al.

(10) Patent No.: US 11,829,460 B2
(45) Date of Patent: Nov. 28, 2023

(54) SYSTEMS AND METHODS FOR BIOMETRIC AUTHENTICATION VIA FACE COVERING

(71) Applicant: Capital One Services, LLC, McLean, VA (US)

(72) Inventors: Cruz Vargas, McLean, VA (US); Bryant Yee, McLean, VA (US); Viraj Chaudhary, McLean, VA (US); Joshua Peters, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 364 days.

(21) Appl. No.: 17/331,720

(22) Filed: May 27, 2021

(65) Prior Publication Data

US 2022/0382839 A1 Dec. 1, 2022

(51) Int. Cl.
| | | |
|---|---|---|
| *G06F 21/00* | (2013.01) | |
| *G06F 21/32* | (2013.01) | |
| *G06F 21/45* | (2013.01) | |
| *G06N 3/084* | (2023.01) | |
| *G06N 3/04* | (2023.01) | |
| *G10L 17/24* | (2013.01) | |
| *G06V 10/147* | (2022.01) | |
| *G06V 40/70* | (2022.01) | |
| *G06V 40/16* | (2022.01) | |

(Continued)

(52) U.S. Cl.
CPC ............. *G06F 21/32* (2013.01); *G06F 18/25* (2023.01); *G06F 21/45* (2013.01); *G06N 3/04* (2013.01); *G06N 3/084* (2013.01); *G06V 10/147* (2022.01); *G06V 40/166* (2022.01); *G06V 40/172* (2022.01); *G06V 40/70* (2022.01); *G10L 17/24* (2013.01); *H04W 4/80* (2018.02)

(58) Field of Classification Search
CPC .......... G06F 21/32; G06F 18/25; G06F 21/45; G06N 3/04; G06N 3/084; G06N 3/09; G06V 10/147; G06V 40/166; G06V 40/172; G06V 40/70; G06V 40/16; G10L 17/24; G10L 17/06; H04W 4/80; H04W 4/02
See application file for complete search history.

(56) References Cited

U.S. PATENT DOCUMENTS

| | | | | |
|---|---|---|---|---|
| 2010/0075631 | A1* | 3/2010 | Black | G06F 21/32 455/410 |
| 2014/0337634 | A1* | 11/2014 | Starner | H04W 12/33 713/186 |

(Continued)

*Primary Examiner* — Jeffrey C Pwu
*Assistant Examiner* — William A Corum, Jr.
(74) *Attorney, Agent, or Firm* — Perkins Coie LLP

(57) ABSTRACT

Methods and systems are described for improvements to authentication processes. For example, conventional systems may rely on password authentication or contact-based alternative authentication techniques that are impractical or infeasible in sensitive medical environments, during pandemics, or fail meet the health and safety needs of an increasingly health-conscious public. In contrast, the described solutions provide an improvement over conventional authentication systems and methods by enabling user authentication via contactless physiological biometric authentication processes, behavioral authentication processes, and passive data authentication processes, that do not require a user to remove personal protective equipment.

20 Claims, 4 Drawing Sheets

(51) Int. Cl.
    *G06F 18/25*     (2023.01)
    *H04W 4/80*     (2018.01)

(56) References Cited

U.S. PATENT DOCUMENTS

| | | | |
|---|---|---|---|
| 2014/0341441 A1* | 11/2014 | Slaby | G06V 40/193 |
| | | | 382/117 |
| 2017/0011263 A1* | 1/2017 | Andersen | G06F 21/32 |
| 2017/0344812 A1* | 11/2017 | Kim | G06V 40/174 |
| 2018/0373924 A1* | 12/2018 | Yoo | G06V 10/454 |
| 2019/0005216 A1* | 1/2019 | Yakishyn | G06F 3/015 |
| 2021/0373850 A1* | 12/2021 | Shah | H04R 1/46 |
| 2022/0067132 A1* | 3/2022 | Learmonth | G06V 10/141 |
| 2022/0075861 A1* | 3/2022 | Nicol | G06F 21/32 |
| 2022/0075862 A1* | 3/2022 | Torre | G06V 40/165 |
| 2022/0208391 A1* | 6/2022 | Mekid | G16H 50/70 |
| 2023/0005316 A1* | 1/2023 | Cha | G07C 9/27 |
| 2023/0206238 A1* | 6/2023 | Jackson | G06Q 20/3278 |
| | | | 705/44 |

* cited by examiner

SYSTEMS AND METHODS FOR BIOMETRIC AUTHENTICATION VIA FACE COVERING

BACKGROUND

Historically, passwords have been foundational security measures for authenticating requests to access applications, files, and documents. However, password authentication methods are vulnerable to fishing schemes, database breaches, and theft. In recent years, the use of alternative non-password authentication methods to avoid the deficiencies in password authentication methods has increased exponentially. Despite the advancement of these alternative authentication methods, many of these solutions tend to not be effective in modern authentication scenarios.

SUMMARY

Methods and systems are described herein for improvements to the use of alternative non-password authentication techniques. For example, conventional authentication systems may rely only on passwords to authenticate a user. Alternatively, some conventional biometric authentication systems may rely on physical user attributes (e.g., eyes, hands, or fingerprints) to be freely accessible and available to perform various authentication techniques regardless of the environment the user is in. However, password authentication remains a highly vulnerable means for authentication and conventional biometric authentication techniques fail to be effective in scenarios where a user cannot expose their physical attributes to complete the authentication process. For example, performing contact-based biometric authentication (e.g., placing a finger on a scanner to access a building) may present a public health concern in sensitive medical environments or a high traffic public space during a pandemic, and therefore may not be possible or practical. One alternative to contact-based biometric authentication is the use of facial recognition techniques. However, due to the recent events related to the COVID-19 pandemic, conventional facial recognition techniques have been rendered ineffective in modern society due to the prevalence of people wearing personal protective equipment on their faces for health and safety reasons.

In view of this problem, the methods and systems described herein include, for example, one or more alternative authentication techniques to authenticate users for verification and identification purposes that do not suffer the drawbacks of conventional password authentication techniques, require contact-based biometrics, or are rendered ineffective by personal protective masks. Specifically, the methods and systems described herein include, for example, authentication techniques to authenticate users for verification and identification purposes while wearing a face mask.

For example, the methods and systems described herein include one or more alternative authentication techniques to authenticate users for verification and identification purposes. For example, a system in communication with a user wearing a face mask may store a biometric signature of a user. In response to an authentication request, receive, via a first device at a face covering, first data related to the user while the user is wearing the face covering, and receive, via a second device at a user device, second data related to the user. The system may generate biometric data associated with the user based on (i) the first data received via the first device at the face covering and (ii) the second data received via the second device at the user device. The system may perform authentication of the user based on the biometric data and the biometric signature of the user to determine whether to authenticate the user. In response to determining to authenticate the user, the system may generate a confirmation of a successful authentication of the user. This solution provides an improvement over conventional authentication systems and methods because a user can be authenticated via contactless physiological biometric authentication processes, behavioral authentication processes, and passive data authentication processes, without the user removing personal protective equipment. Moreover, in this scenario a user can be authenticated to access multiple applications and/or devices. Additionally, or alternatively, various forms of biometric data can be gathered in furtherance of the authentication process.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, structures and devices are shown in block diagram form to avoid unnecessarily obscuring the embodiments of the invention.

Figure 1:
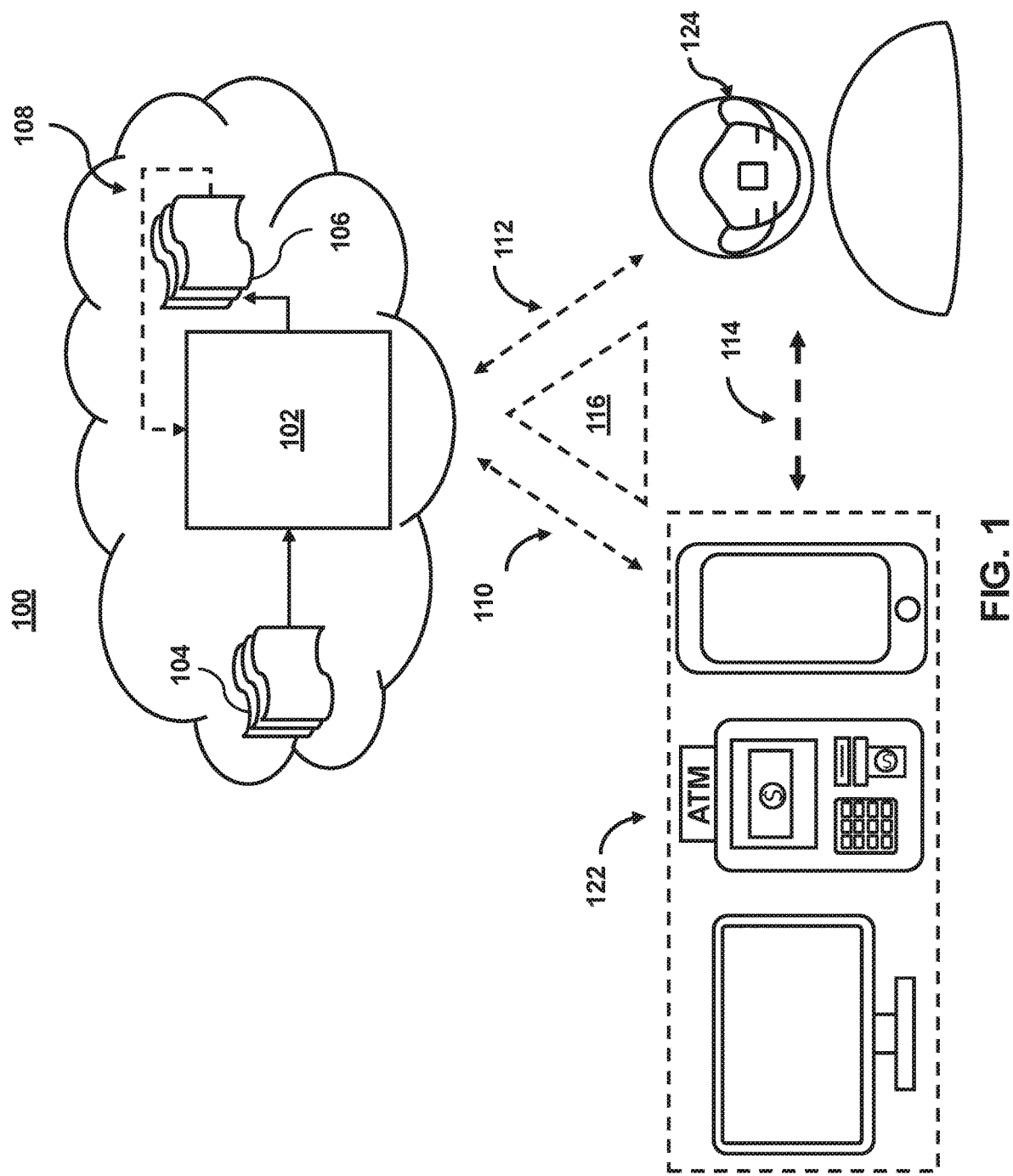
FIG. 1 shows an illustrative system architecture for biometric authentication, in accordance with one or more embodiments.
Figure 2:
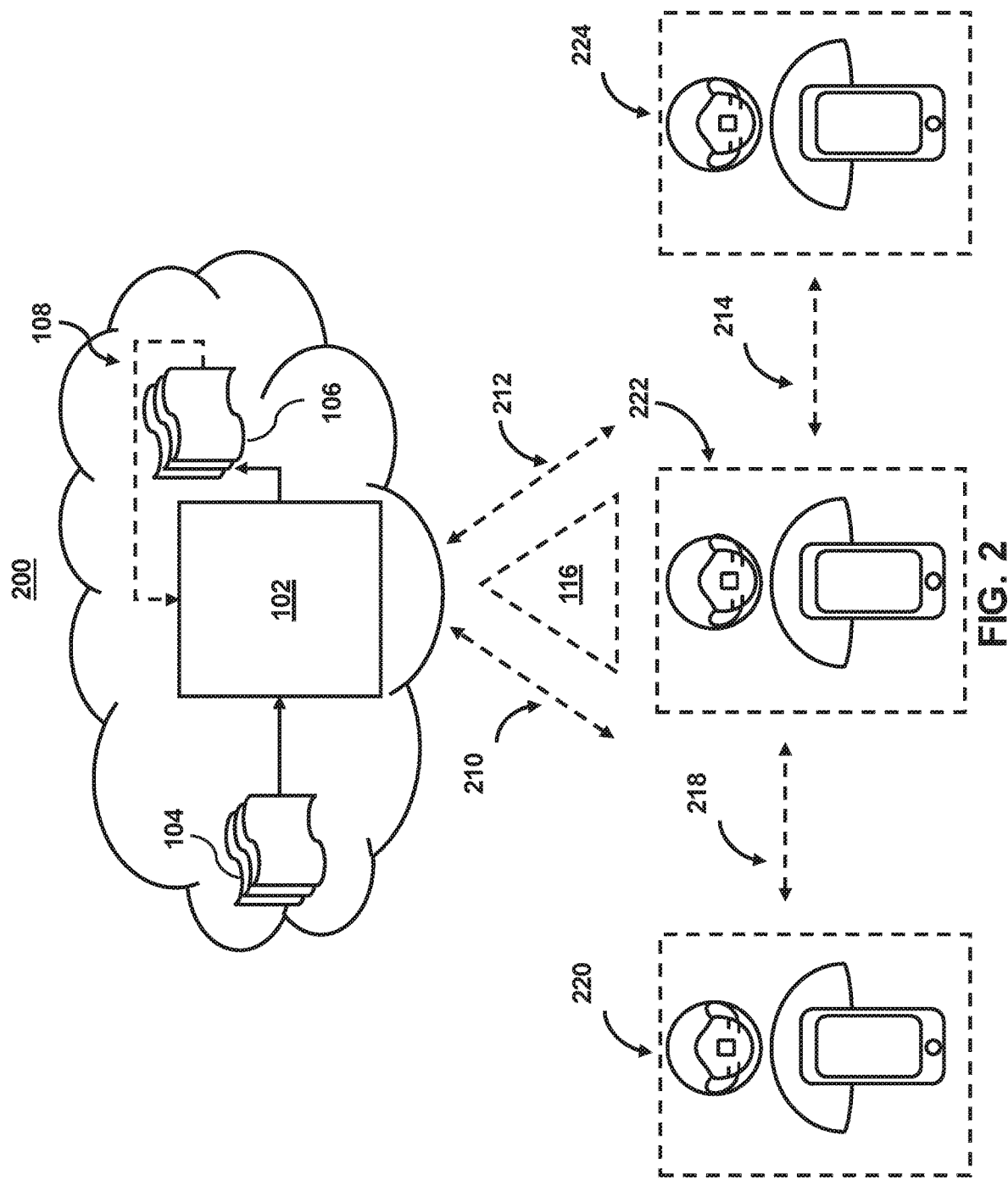
FIG. 2 shows an illustrative system architecture for biometric authentication, in accordance with one or more embodiments.
Figure 3:
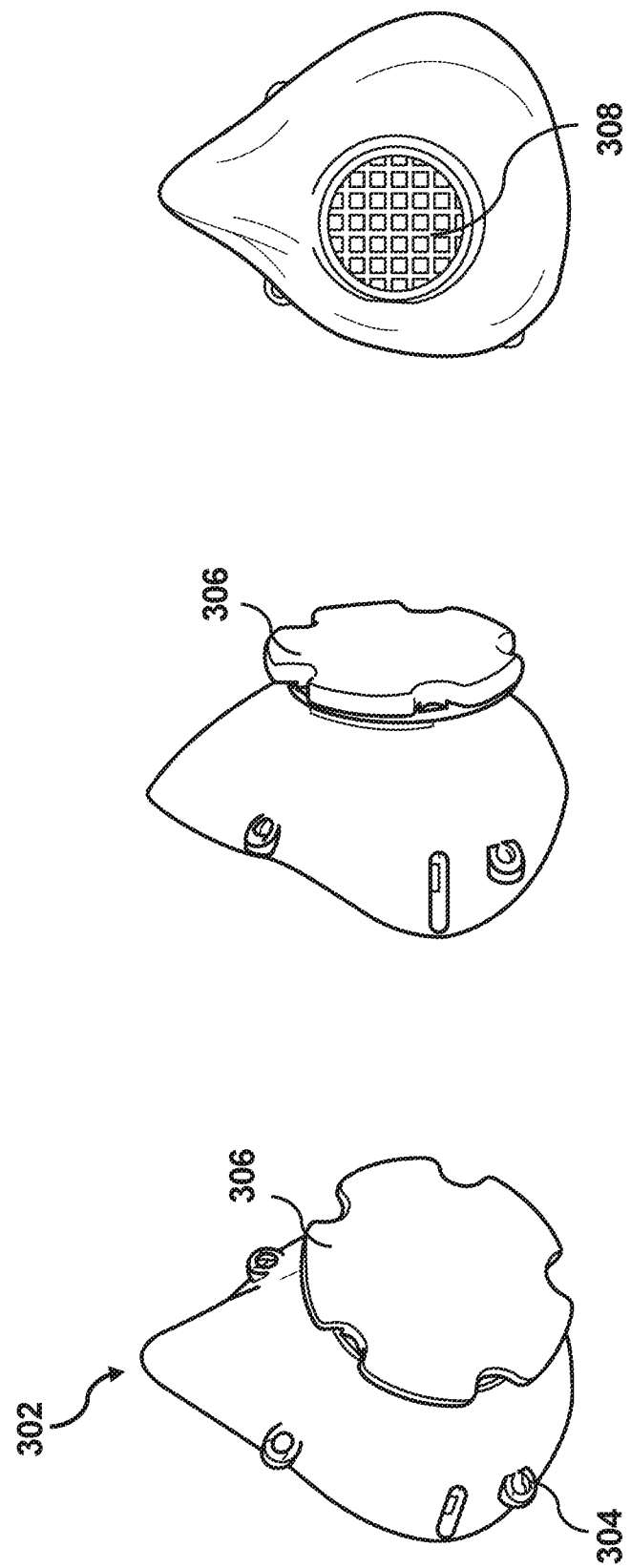
FIG. 3 shows an illustrative diagram of personal protective equipment configured with biometric sensors, in accordance with one or more embodiments.
Figure 4:
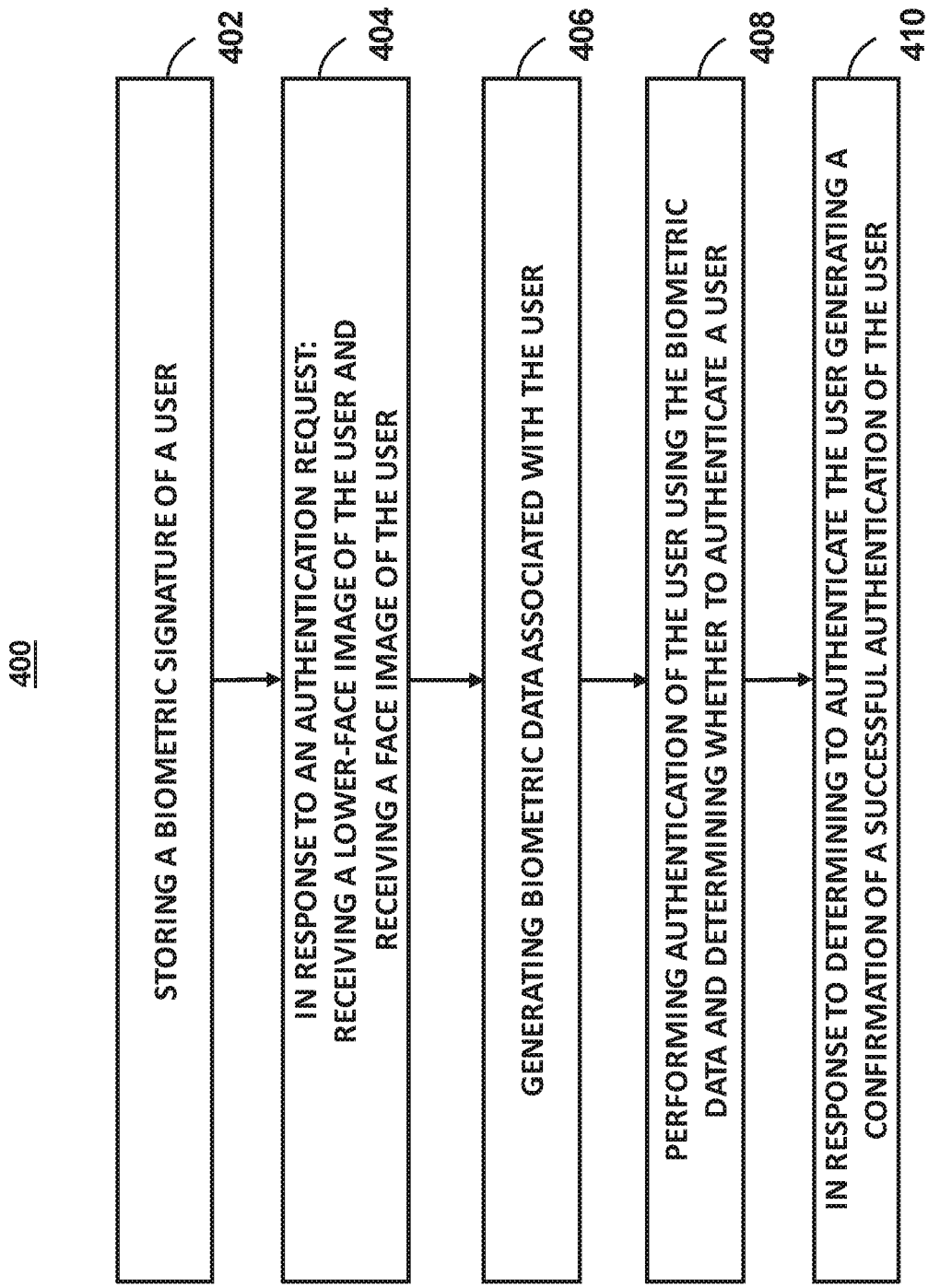
FIG. 4 shows a flowchart for biometric authentication, in accordance with one or more embodiments.

FIG. 1 shows an illustrative system architecture for biometric authentication, in accordance with one or more embodiments. For example, system 100 may represent the components used for biometric authentication, as shown in FIGS. 2-4. As shown in FIG. 1, system 100 may include a mobile device (or alternatively an automated teller machine, a computer, or a kiosk) 122 and personal protective equipment (e.g., face mask, helmet, face shield, body suit) 124. While shown as a smartphone 1, in FIG. 1, it should be noted that mobile device 122 may be any computing device, including, but not limited to, a laptop computer, a tablet computer, a hand-held computer, other computer equipment (e.g., a server), including "smart," wireless, wearable, and/or mobile devices. FIG. 1 also includes cloud components 108. Cloud components 108 may alternatively be any computing device as described above and may include any type of mobile terminal, fixed terminal, or other device. For example, cloud components 108 may be implemented as a cloud computing system and may feature one or more component devices. It should also be noted that system 100 is not limited to three devices. Users may, for instance, utilize one or more devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of mobile device 122, those operations may, in some embodiments, be performed by components of cloud components 108. In some embodiments, the various computers and systems described herein may include one or more computing devices that are programmed to perform the described functions. Additionally, or alternatively, multiple users may interact with system 100 and/or one or more components of system 100. For example, in one embodiment, a first user and a second user may interact with system 100 using two different components.

In a non-limiting embodiment, the system may store a biometric signature of a user wearing a face covering and may be in communication with the user.

As referred to herein, a "biometric signature" may be a mathematical representation, data representation, biometric hash, or biometric vector, representative of an entity's physical or behavioral biometric data. The biometric signature may have been generated based on biometric data of an entity captured over time. The biometric signature may be refined over time using a machine learning model, for example the machine learning model discussed infra in FIG. 1.

Additionally, a "biometric hash" or "hash" may be a cryptographic hash function, that is, a one-way mathematical algorithm that maps data of any size to a bit string of a fixed size. The biometric hash may be created by inputting data into a collision resistant hash function, wherein the data is converted to a bit string, for example hexadecimal representation of the original data. The biometric hash may be salted. For example, random fixed length data may be added to the input data prior to the input data being hashed by the cryptographic hash function, thereby adding a layer of security to the hashing process to protect against hacking, such as brute force attacks.

The system may receive an authentication request, via a first device at the face covering worn by the user, first data related to the user while the user is wearing the face covering, and receive, via a second device at a user device, second data related to the user.

As referred to herein, a "face covering" may be personal protective equipment, and as such may alternatively be a face mask, a head covering, helmet, a body suit, a face shield, glasses, or gloves. The face covering (i.e., personal protective equipment) may be constructed and made of material conducive for wear by a living organism, for example, a human (or alternatively a dog, cat, etc.).

In addition to receiving an authentication request, the system may additionally receive first data related to the user, wherein the first data may be an image including data representative of body measurements or characteristics unique to the user sensed by a sensor, for example a camera, on the face covering.

As referred to herein, a "sensor" may be a device that detects, indicates, captures, or measures a physical property, or otherwise responds to it. While the sensor discussed in the instant embodiment may be one or more cameras, other sensors may be used. For example, the system may use one or more optical sensors, solid-state transducer sensors, ultrasound sensors, temperature sensors, infrared sensors, ultrasonic sensors, touch sensors, touch sensors, proximity sensors, pressure sensors, level sensors, humidity sensor, acceleration sensors, sound sensors, passive sensors. A sensor may be capable of detecting, capturing, or measuring fingerprints, veins, face recognition, DNA, palm print, hand geometry, iris recognition, breath, retina, and odor/scent.

This image may capture the portion of the user's face that is covered by the face covering. In this instance, the second data may be a second image sensed at a second sensor, for example a camera, on a mobile device that is operated by the user, wherein the second image captures a portion of the face not covered by the face covering. The system may generate biometric data associated with the user based on (i) the first data received via the first device at the face covering and (ii) the second data received via the second device at the user device.

As referred to herein, "biometric data" may mean physical and/or behavioral characteristics of a living organism (e.g., a human) that can be used to identify and verify the identity of the living organism. Biometric data associated with physical characteristics may include but are not limited to fingerprints, veins, face recognition, DNA, palm print, hand geometry, iris recognition, breath, retina, and odor/scent. Biometric data associated with behavioral characteristics may include but are not limited to typing rhythm, gait, keystroke, signature, behavioral profiling, and/or voice.

The system may perform authentication of the user based on the biometric data and the biometric signature of the user to determine whether to authenticate the user. In response to determining to authenticate the user, the system may generate a confirmation of a successful authentication of the user. Once authenticated, the user may be permitted to access an application, a physical building/area, or conduct a transaction, and/or permitted to communicate with another device or user. This solution provides an improvement over conventional authentication systems and methods because a user can be authenticated via contactless physiological biometric authentication processes, for example facial recognition, without the user removing personal protective equipment.

With respect to the components of mobile device 122, personal protective equipment 124, and cloud components 108, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 1, mobile device 122 may include a display on which to display data.

Additionally, as mobile device 122 is shown as a touchscreen smartphone, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or other suitable program). The application may cause the processors and/or control circuitry to perform operations related to generating alternative content.

Personal protective equipment 124 is shown as a face mask, but may be a head covering, helmet, a body suit, a face shield, glasses, or gloves. Personal protective equipment 124 may be constructed and made of material conducive for wear by a living organism, for example, a human (or alternatively a dog, cat, etc.). Personal protective equipment 124 may include components as further described in FIGS. 3 and 4, such as a detachable cover (not show in FIG. 1). The detachable cover may include one or more sensors to capture biometric data from the user wearing the personal protective equipment 124. The detachable cover may additionally include a communication component configured to communicate with mobile device 122 or cloud components 108. The personal protective equipment 124 may include a power source (not shown in FIG. 1) such as a rechargeable battery.

The mobile device 122 and personal protective equipment 124 may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes communication paths 110, 112, and 114. Communication paths 110, 112, and 114 may include the Internet, a mobile phone network, a mobile voice, or data network (e.g., a 5G or LTE network), a cable network, a public switched telephone network, or other types of communications networks or combinations of communications networks. Communication paths 110, 112, and 114, may additionally include infrared, WiFi, LiFi, Bluetooth, Near Field Communication (NFC), electric fields, magnetic fields, and RFID. Communication paths 110, 112, and 114 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The communication paths 110, 112, and 114 may include additional communication paths linking a plurality of hardware, software, and/or firmware components operating together. For example, the computing devices may be implemented by a cloud of computing platforms operating together as the computing devices.

Cloud components 108 may be a database configured to store user data for a user. For example, the database may include user data, for example a biometric signature associated with the user, that the system has collected about the user through prior interactions, both actively and passively. Alternatively, or additionally, the system may act as a clearing house for multiple sources of information about the user. This information may be compiled into a cross-platform profile. For example, one or more of cloud components 108 may include a microservice and/or components thereof. In some embodiments, the microservice may be a collection of applications that each collect one or more of the plurality of variables.

Cloud components 108 may include model 102, which may be a machine learning model. Model 102 may take inputs 104 and provide outputs 106. The inputs may include multiple datasets such as a training dataset and a test dataset. Each of the plurality of datasets (e.g., inputs 104) may include data subsets related to user data, original content, and/or alternative content. In some embodiments, outputs 106 may be fed back to model 102 as inputs to train model 102. For example, the system may receive a first labeled feature input, wherein the first labeled feature input is labeled with a known error (or error likelihood) for the first labeled feature input (e.g., based on a collection of variables). The system may then train the first machine learning model to classify the first labeled feature input with the known error (or error likelihood). The machine learning model may receive authenticated biometric data as input and further refine a biometric signature.

In another embodiment, model 102 may update its configurations (e.g., weights, biases, or other parameters) based on the assessment of its prediction (e.g., outputs 106) and reference feedback information (e.g., user indication of accuracy, reference labels, or other information). In another embodiment, where model 102 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 102 may be trained to generate better predictions.

In some embodiments, model 102 may include an artificial neural network. In such embodiments, model 102 may include an input layer and one or more hidden layers. Each neural unit of model 102 may be connected with many other neural units of model 102. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 102 may be self-learning and trained, rather than explicitly programmed, and can perform significantly better in certain areas of problem solving, as compared to traditional computer programs. During training, an output layer of model 102 may correspond to a classification of model 102, and an input known to correspond to that classification may be input into an input layer of model 102 during training. During testing, an input without a known classification may be input into the input layer, and a determined classification may be output.

In some embodiments, model 102 may include multiple layers (e.g., where a signal path traverses from front layers to back layers). In some embodiments, back propagation techniques may be utilized by model 102 where forward stimulation is used to reset weights on the "front" neural units. In some embodiments, stimulation and inhibition for model 102 may be more free-flowing, with connections interacting in a more chaotic and complex fashion. During testing, an output layer of model 102 may indicate whether or not a given input corresponds to a classification of model 102 (e.g., an incident).

For example, in some embodiments, the system may train a machine learning model (e.g., an artificial neural network) to detect a known error (or error likelihood) based on a collection of variables. The system may then generate a series of feature inputs based on the training data. For example, the system may generate a first feature input based on training data comprising user data corresponding to a first known error (or error likelihood). The system may label the first feature input with the first known error (e.g., labeling the data as corresponding to a classification of a given error type or likelihood).

For example, in some embodiments, the system may train a machine learning model (e.g., an artificial neural network) to determine a univariate response corresponding to the recommendation (e.g., a given error or error likelihood). For example, the system may receive an error recommendation (e.g., comprising a given error type and/or error likelihood). The system may then generate a series of features inputs based on the error recommendation. For example, the system may generate a first feature input based on training data comprising error recommendation and the system may determine a response (e.g., particular documentation or actions) corresponding to responding to a first known error recommendation. The system may label the first feature input with the first known error recommendation (e.g., labeling the data as corresponding to a classification of a given error type or likelihood).

The system may then train a machine learning model to detect the first known incident based on the labeled first feature input. The system may also train a machine learning model (e.g., the same or different machine learning model) to detect the second known incident based on the labeled second feature input. For example, the training process may involve initializing some random values for each of the training matrices (e.g., of a machine learning model) and attempting to predict the output of the input feature using the initial random values. Initially, the error of the model will be large, but comparing the model's prediction with the correct output (e.g., the known classification), the model is able to adjust the weights and biases values until having the model provides the required predictions.

The system may receive user data via a microservice and/or other means. For example, the microservice may comprise a collection of applications that each collect one or more of a plurality of variables. For example, the system may extract user data from an API layer operating on a user device or at a service provider (e.g., via a cloud service accessed by a user). Additionally or alternatively, the system may receive user data files (e.g., as a download and/or streaming in real-time or near real-time).

System 100 also includes API layer 116. For example, in some embodiments, the system may be implemented as one or more APIs and/or an API layer. In some embodiments, API layer 116 may be implemented on mobile device 122 or personal protective equipment 124. Alternatively or additionally, API layer 116 may reside on one or more of cloud components 108. API layer 116 (which may be A REST or Web services API layer) may provide a decoupled interface to data and/or functionality of one or more applications. API layer 116 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 116 may use various architectural arrangements. For example, system 100 may be partially based on API layer 116, such that there is strong adoption of SOAP and RESTful Web-services, using resources like Service Repository and Developer Portal but with low governance, standardization, and separation of concerns. Alternatively, system 100 may be fully based on API layer 116, such that separation of concerns between layers like API layer 116, services, and applications are in place.

In some embodiments, the system architecture may use a microservice approach. Such systems may use two types of layers: Front-End Layer and Back-End Layer where microservices reside, in this kind of architecture, the role of the API layer 116 may provide integration between Front-End and Back-End. In such cases, API layer 116 may use RESTful APIs (exposition to front-end or even communication between microservices). API layer 116 may use AMQP (e.g., Kafka, RabbitMQ, etc.). API layer 116 may use incipient usage of new communications protocols such as gRPC, Thrift, etc.

In some embodiments, the system architecture may use an open API approach. In such cases, API layer 116 may use commercial or open-source API Platforms and their modules. API layer 116 may use developer portal. API layer 116 may use strong security constraints applying WAF and DDoS protection, and API layer 116 may use RESTful APIs as standard for external integration.

FIG. 2 shows an illustrative system architecture for biometric authentication, in accordance with one or more embodiments. As shown in FIG. 2, system 200 may include multiple users (as opposed to just one user), for example user 220, user 222, and user 224 in communication with one another and system 100. Each user 220, 222, and 224 may have a client device (e.g., a mobile device or wearable device, such as a smart watch) or other components. Each of the client devices may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. Users 220, 222, and 224, may, for instance, utilize one or more client devices to interact with one another, one or more servers, or other components of system 200. It should be noted that, while one or more operations are described herein as being performed by particular components of system 200, those operations may, in some embodiments, be performed by other components of system 100.

Each of the users 220, 222, and 224, may be in possession of personal protective equipment, which is shown as a face mask, but may be a head covering, helmet, a body suit, a face shield, glasses, gloves, or any wearable. The personal protective equipment may be constructed and made of material conducive for wear by a living organism, for example, a human (or alternatively a dog, cat, etc.). The personal protective equipment may include components as further described in FIG. 3, such as a detachable cover (not show in FIG. 2). The detachable cover may include one or more sensors to capture biometric data from the user wearing the personal protective equipment. The detachable cover may additionally include a communication component configured to communicate with client devices or cloud components 108. The personal protective equipment may include a power source (not shown in FIG. 2) such as a rechargeable battery.

In a non-limiting embodiment, system 200 may store a biometric signature of one or more users wearing a face covering and may be in communication with each of the users 220, 222, and 224. For example, in one instance, system 200 may store the biometric signature in a secure enclave or in a storage device located in cloud components 108 or the biometric signature of each of the users 220, 222, and 224, may by stored in a storage located on the user device of each respective user. The system 200 may receive an authentication request, via a first device at the face covering worn by user 220, and first data related to user 220 while the user is wearing the face covering, and receive, via a second device at a user device (e.g., a client device operated by user 220), second data related to user 222. Here, for example, in addition to receiving an authentication request, the system may additionally receive first data related to the user, wherein the first data may be an image including data representative of body measurements or characteristics unique to the user sensed by a sensor, for example a camera, on the face covering. This image may capture the portion of the face of user 220 that is covered by the face covering. In this instance, the second data may be a second image sensed at a second sensor, for example a camera, on a client device that is operated by user 220, wherein the second image captures a portion of the face not covered by the face covering. Similar images may be captured of users 222 and 224 through the steps explained above. System 200 may generate biometric data associated with user 220 based on (i) the first data received via the first device at the face covering and (ii) the second data received via the second device at the user device. Notably, similar steps may be taken to generate biometric data for users 222 and 224. System 200 may perform authentication of users 220, 222, and 224 based on the biometric data and the biometric signature of the user to determine whether to authenticate the user. In response to determining to authenticate users 220, 222, and 224, the system may generate a confirmation of a successful authentication of users 220, 222, and 224. Once authenticated, users 220, 222, and 224 may be permitted to access an application, conduct a transaction, and/or permitted to communicate with one another. In this embodiment, users 220, 222, and 224 may want to communicate with each other via their respective client devices, settle a payment, or split a check in an environment that is not conducive for users 220, 222, and 224 to remove their personal protective equipment and this solution provides an improvement over conventional authentication systems and methods because a user can be authenticated via contactless physiological biometric authentication processes, for example facial recognition, without the user removing personal protective equipment. Thus, once authenticated, users 220, 222, and 224 may be able to access their client devices, for example, to communicate or complete the desired transaction.

FIG. 2 also includes communication paths 210, 212, 214, and 218. Communication paths 210, 212, 214, and 218 may include the Internet, a mobile phone network, a mobile voice, or data network (e.g., a 5G or LTE network), a cable network, a public switched telephone network, or other types of communications networks or combinations of communications networks.

Communication paths 210, 212, 214, and 218, may additionally include infrared, WiFi, LiFi, Bluetooth, Near Field Communication (NFC), electric fields, magnetic fields, and RFID.

Communication paths 210, 212, 214, and 218 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The communication paths 210, 212, 214, and 218 may include additional communication paths linking a plurality of hardware, software, and/or firmware components operating together.

For example, the computing devices may be implemented by a cloud of computing platforms operating together as the computing devices.

Notably, each of the client devices may also include circuitry and memory in the form of electronic storage as noted in the description of the devices in FIG. 1. Additionally, the users 220, 222, and 224 may be in communication with cloud components 108 via communication paths 210, 212, 214, and 218. As such, the features described above regarding FIG. 2 may interact with any combination of the features described in FIG. 1.

FIG. 3 shows an illustrative diagram of personal protective equipment configured with biometric sensors, in accordance with one or more embodiments. As shown in FIG. 3, personal protective equipment 302 may be a face mask, a shield, a body suit, or any form of wearable protective equipment. Personal protective equipment 302 may include strap hooks 304 constructed as components meant to receive various straps, cords, or bands, that aid in securing the personal protective equipment 302 to a user. Personal protective equipment 302 may include a detachable cover 306. Detachable cover 306 may include one or more sensors, communication components, and power units (e.g., a rechargeable battery). Personal protective equipment 302 and/or detachable cover 306 may include cameras, optical sensors, solid-state transducer sensors, ultrasound sensors, temperature sensors, infrared sensors, ultrasonic sensors, touch sensors, touch sensors, proximity sensors, pressure sensors, level sensors, humidity sensors, acceleration sensors, sound sensors, passive sensors, and the like. Detachable cover 306 independently or in conjunction with the personal protective equipment 302, may be configured to pair with a mobile device of a user thereby enabling bi-directional communication between the detachable cover 306 and the mobile device. Alternatively, the detachable cover 306 may be configured to be paired with another device, for example, a wearable technology (e.g., a smartwatch or jewelry), automated teller machine (ATM), or a kiosk. Detachable cover 306 may be removeable and detach from the personal protective equipment 302. Personal protective equipment 302 may include a breath receptacle 308. Breath receptable 308 may be configured to allow airflow between an outside environment and an environment that the personal protective equipment 302 is covering. Breath receptacle 308 may be configured to operate as a filter or may be configured to work in conjunction with filters (e.g., air filters). It should be understood that the features discussed in FIG. 3 work in conjunction with any combination of the features discussed in FIGS. 1, 2, and 4.

FIG. 4 shows a flowchart for biometric authentication, in accordance with one or more embodiments. At step 402, process 400 (e.g., using one or more components in system 100 (FIG. 1)) stores a biometric signature of a user. For example, a system in communication with a user wearing a face mask may store a biometric signature of the user, the biometric signature corresponding to a facial pattern (or facial measurements) of the user. While step 402 and the subsequent steps disclose the use of a face mask, it should be understood that any form of personal protective equipment previously mentioned may be used as an alternative, for example personal protective equipment 302, and may include one or more users as described in FIG. 2. In this instance, the machine learning model may use biometric data as input for the machine learning model.

At step 404, process 400 (e.g., using one or more components in system 100 (FIG. 1)), in response to an authentication request, receives a lower-face image of the user and a face image of the user. For example, in response to an authentication request from the user, the system may receive, via a first camera at a face mask, a lower-face image of the user while the user is wearing the face mask, the lower-face image being an image representing detected user-related characteristics behind the mask, and a face image of the user via a second camera at the user device. In this step, the camera may be located on the face mask or a detachable component, for example, detachable cover 306. The camera may capture an image of the portion of a face covered by the face mask and the image may include data unique to the face that allows biometric data to be generated and metadata including information regarding an identification number of the face mask or detachable cover, a time stamp for when the image was taken, and geographic location the image was taken at. Similar to the image captured by a camera at the face mask, an image may be captured by a user device. The user device in this scenario may be a mobile phone, however it could also be a wearable device (e.g., a smart watch) or alternatively the second device could be a device the user is operating (e.g., an automated teller machine), or device that grants access to a physical location or an application.

At step 406, process 400 (e.g., using one or more components in system 100 (FIG. 1)), may generate biometric data associated with the user. For example, the system may generate biometric data associated with the user using (i) the lower-face image received via the first camera at the face mask and (ii) the face image received via the second camera at the user device. In generating biometric data, facial recognition techniques may be performed to generate the biometric data. For example, the images captured by the first and second camera (e.g., digital cameras) may be analyzed for data unique to a user, such as measurements of facial features (e.g., an algorithm may analyze the relative position, size, and/or shape of the eyes, nose, cheekbones, and jaw) and the data unique to the user may be converted into a template. As an alternative to analyzing images captured from a digital camera, images may be captured through lidar, infrared cameras, and/or time of flight cameras. In this instance an infrared camera, and corresponding components (e.g., dot projector, flood illuminator, ambient light sensor, and proximity sensor) may project an IR matrix (e.g., numerous infrared dots) onto the entirety or a portion of a face. Here, for a predetermined amount of time, the infrared camera may be rotated around the face or the face may be rotated in front of the infrared camera so that the portion or entirety of the face can be captured. Additionally, the infrared camera and its corresponding components may measure how long it takes for light to bounce off the features of the face, wherein a unique depth map of the face is generated.

At step 408, process 400 (e.g., using one or more components in system 100 (FIG. 1)), may perform authentication of the user using the biometric data and determine whether to authenticate the user. For example, the unique depth map may be a mathematical representation of the captured measurements, and in furtherance of step 406, wherein the unique data is converted into a template, in order to authenticate the user, the template may be compared against a biometric signature or biometric data already known about the user. The comparison may require that the template match the biometric signature within a certain pre-determined threshold in order for the user to be authenticated. In instances where the template does not exceed the pre-determined threshold, the user authentication may be denied. In the instance wherein lidar and/or infrared cameras (or similar imaging technology are used), the unique depth map may be compared against previously stored biometric information, such as a biometric signature refined over time by the user performing an authentication process. Again, the unique depth map and biometric signature may be a mathematical representations, as such, the comparison may require that the unique depth map and biometric signature match within a certain threshold. For example, hashes may be generated and associated with the unique depth map and the biometric signature respectively and in order to compare and match the hashes, a pre-determined number of alphanumeric values corresponding to the hashes may need to match between the respective hashes. Additional steps may be required in order to authenticate a user. For example, a proximity of a communication component located on the face mask (or located on the detachable cover) in relation to the user device may be determined. The determined proximity may be compared to known proximity data associated with the user, wherein the known proximity data is an average distance between the user device and the face mask determined based on past authentications. Upon determining the that the proximity data matches known proximity data within a certain pre-determined threshold, the user may be authenticated. For example, if a user normal (on average) holds a mobile device three feet away from the user's face in order to capture an image for authentication purposes, this average may be used for authentication purposes and compared against future instances where authentication is requested. In addition to geospatial data, geospatial data may be used to authenticate a user. For example, geospatial data associated with the authentication request may be received. In response to receiving geospatial data, historical geospatial data from a user profile associated with the user may be retrieved from a storage device, wherein the historical geospatial data indicates an angle pattern (e.g., geographical coordinates and height above sea level) in which the second sensor data is typically received by the second sensor at the user device. The geospatial data may be compared to the historical geospatial data in order to determine whether to authenticate the user. For example, if the geospatial data matches the historical geospatial data match within a certain threshold then the user may be authenticated. Additionally or alternatively, step 408 may be used in conjunction with a multifactor authentication process. For example, authenticating the user by determining whether the template matches the biometric signature within a certain pre-determined threshold, may serve as one category/form of identifying a user within a multifactor authentication process. In furtherance of the multifactor authentication process, the user may be required to submit or confirm their identity via another device (e.g., by entering a personal identification number PIN at an ATM, submitting a PIN on mobile device 122, etc.).

At step 410, process 400 (e.g., using one or more components in system 100 (FIG. 1)), may in response to determining to authenticate the user, generate a confirmation of a successful authentication of the user. For example, the user may receive a notification regarding the result of the authentication process conducted in step 408. In this instance, a visual notification (e.g., text message, email, pop-up, etc.) may be sent to a mobile device or personal protective equipment operated by the user. Alternatively, the notification may be in the form of audio or a vibration. Additionally, the notification may appear on another device the user is operating or attempting to access, such as an automated teller machine (ATM) or a device attached to a building. As another alternative, the notification may appear in an application.

As discussed in FIGS. 1 and 2, alternative steps and combinations may be possible. For example, as an alternative to generating biometric data associated with a face, biometric data may be generated based on data derived from captured voice or breath data. As discussed in steps 402-410 as it relates to a facial recognition, a system may alternatively or additionally capture voice and breath data. The voice or breath data may be stripped of unnecessary information and converted into mathematical representations. The voice or breath data (other physiological or behavioral data) may be captured via sensors, for example optical sensors, solid-state transducer sensors, ultrasound sensors, temperature sensors, infrared sensors, ultrasonic sensors, touch sensors, touch sensors, proximity sensors, pressure sensors, level sensors, humidity sensor, acceleration sensors, sound sensors, passive sensors, as discussed in the description of FIG. 3. A user may be authenticated using voice and breath data by comparing the mathematical representations of the voice and breath data against a biometric signature. Upon determining that the mathematical representations match the biometric signature within a certain pre-determined threshold, the user may be authenticated. As discussed with respect to step 410, here the user may receive a notification regarding the result of the authentication.

As discussed in FIGS. 1 and 2, there may be a plurality of devices. For example, with respect to step 402, the second device may be an automated teller machine (or a kiosk). The purpose of performing step 408 may be to permit a user to perform one or more transactions at the automated teller machine. Alternatively, there may be several users wearing personal protective equipment as disclosed with respect to FIG. 2. In this instance, some or all of the steps 402-410 may be performed in order for the users to communicate (access their respective mobile devices and/or send communication via their respective devices) or conduct a transaction (e.g., settle a bill or make a joint payment) with one another.

It is contemplated that the steps or descriptions of FIG. 4 may be used with any other embodiment of this disclosure. In addition, the steps and descriptions described in relation to FIG. 4 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-3 could be used to perform one or more of the steps in FIG. 4.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method, the method comprising: storing a biometric signature of a user wearing a face mask, the biometric signature corresponding to a facial pattern of the user; in response to an authentication request from the user, the system may receive, via a first camera at a face mask, a lower-face image of the user while the user is wearing the face mask, the lower-face image being an image representing detected user-related characteristics behind the mask, and a face image of the user via a second camera at the user device; generating, biometric data associated with the user using (i) the lower-face image received via the first camera at the face mask and (ii) the face image received via the second camera at the user device; authenticating the user using the biometric data and the stored biometric signature of the user to determine whether to authenticate the user; in response to determining to authenticate the user, generating a confirmation of a successful authentication of the user for presentation on a user interface.

2. A method, the method comprising: storing a biometric signature of a user wearing a face covering; in response to an authentication request, receiving, via a first sensor at the face covering, first sensor data related to the user while the user is wearing the face covering, the first sensor data representing one or more detected user-related characteristics behind the face covering, and receive, via a second sensor at a user device, second sensor data of the user; generating, biometric data associated with the user based on (i) the first sensor data received via the first sensor at the face covering and (ii) the second sensor data received via the second sensor at the user device; authenticating the user based on the biometric data and the biometric signature of the user to determine whether to authenticate the user; in response to determining to authenticate the user, generating a confirmation of a successful authentication of the user.

3. A method, the method comprising: storing a biometric signature of a user; in response to an authentication request, receiving, via a first device at a face covering, first data related to the user while the user is wearing the face covering, and receive, via a second device at a user device, second data related to the user; generating biometric data associated with the user based on (i) the first data received via the first device at the face covering and (ii) the second data received via the second device at the user device; authenticating the user based on the biometric data and the biometric signature of the user to determine whether to authenticate the user; in response to determining to authenticate the user, the generating a confirmation of a successful authentication of the user.

4. The method of any one of the preceding embodiments, further comprising: determining a proximity of a communication component located on the face covering to the user device; comparing the proximity to known proximity data associated with the user, wherein the known proximity data is an average distance between the user device and the face covering determined based on past authentications; and determining to authenticate the user based on the comparison between the proximity and the known proximity data.

5. The method of any one of the preceding embodiments, further comprising: determining geospatial data associated with the authentication request; retrieving historical geospatial data from a user profile associated with the user, wherein the historical geospatial data indicates an angle pattern in which the second sensor data is typically received by the second sensor at the user device; comparing the geospatial data to the historical geospatial data; and determining to authenticate the user based on the comparison between the geospatial data and the historical geospatial data.

6. The method of any one of the preceding embodiments, further comprising: receiving a first image, wherein first sensor data includes the first image; receiving a second image, wherein the second sensor data includes the second image; and combining the first image and the second image to create a composite image.

7. The method of any one of the preceding embodiments, further comprising: determining a predetermined match threshold; conducting facial recognition techniques on the composite image to generate the biometric data; and determining to authenticate the user based on the biometric data being within the predetermined match threshold.

8. The method of any one of the preceding embodiments, further comprising: determining a detachable cover ID associated with a detachable cover, wherein the detachable cover is attached to the face covering and houses the first sensor and a communication component; determining a user device ID associated with the user device; and storing the detachable cover ID and user device ID with a user profile in a database.

9. The method of any one of the preceding embodiments, further comprising: receiving an indication that the detachable cover was secured to the face covering when the authentication request was received, wherein the indication was received along with the authentication request from the user device; and generating the biometric data in response to receiving the indication that the detachable cover was secured to the face covering.

10. The method of any one of the preceding embodiments, further comprising: receiving an indication that a communication component was paired to the user device when the authentication request was received, wherein the communication component is configured to transmit signals via near field communication (NFC), RFID, infrared, electric fields, magnetic fields, WiFi, or Bluetooth; and receiving the first sensor data in response to receiving the indication that the communication component was paired to the user device when the authentication request was received.

11. The method of any one of the preceding embodiments, further comprising: receiving voice data from the first sensor, wherein the first sensor data includes the voice data; and conducting audio analysis on the voice data to generate the biometric data.

12. The method of any one of the preceding embodiments, further comprising: determining a predetermined match threshold; retrieving historical biometric data associated with previously received voice data; determining, based on the comparison between the generated biometric data and the historical biometric data, whether the generated biometric data matches the historical biometric data within a predetermined threshold.

13. A system comprising: one or more processors; and memory storing instructions that, when executed by the processors, cause the processors to effectuate operations comprising those of any of embodiments 1-12.

14. A tangible, non-transitory, machine-readable medium storing instructions that, when executed by a data processing apparatus, cause the data processing apparatus to perform operations comprising those of any of embodiments 1-12.

What is claimed is:

1. A user device for biometric authentication, the user device comprising:
   one or more processors programmed with instructions that, when executed by the one or more processors, cause operations comprising:
      storing a biometric signature of a user, the biometric signature corresponding to a facial pattern of the user;
      in response to an authentication request:
         receiving, via a first camera at a face mask, a lower-face image of the user while is the user is wearing the face mask, the lower-face image being an image representing detected user-related characteristics behind the face mask; and
         receiving, via a second camera at the user device, a face image of the user;
      generating biometric data associated with the user using (i) the lower-face image received via the first camera at the face mask and (ii) the face image received via the second camera at the user device;
      performing authentication of the user using the biometric data and the stored biometric signature of the user to determine whether to authenticate the user; and
      in response to determining to authenticate the user, generating a confirmation of a successful authentication of the user for presentation on a user interface.

2. A computer-implemented method for biometric authentication comprising:
   storing a biometric signature of a user;
   in response to an authentication request:
      receiving, via a first sensor at a face covering, first sensor data related to the user while the user is wearing the face covering, the first sensor data representing one or more detected user-related characteristics behind the face covering, the first sensor data comprising a first image; and
      receiving, via a second sensor at a user device, second sensor data of the user, the second sensor data comprising a second image;
   creating a composite image from (i) the first image of the first sensor data and (ii) the second image of the second sensor data;
   generating biometric data associated with the user based on the composite image;
   performing authentication of the user based on the biometric data and the biometric signature of the user; and
   generating a confirmation of a successful authentication of the user based on the authentication of the user.

3. The computer-implemented method of claim 2, further comprising:
   determining a proximity of a communication component located on the face covering to the user device;
   comparing the proximity to known proximity data associated with the user, wherein the known proximity data is an average distance between the user device and the face covering determined based on past authentications; and determining to authenticate the user based on the comparison between the proximity and the known proximity data.

4. The computer-implemented method of claim 2, further comprising:

determining geospatial data associated with the authentication request;

retrieving historical geospatial data from a user profile associated with the user, wherein the historical geospatial data indicates an angle pattern in which the second sensor data is typically received by the second sensor at the user device;

comparing the geospatial data to the historical geospatial data; and determining to authenticate the user based on the comparison between the geospatial data and the historical geospatial data.

5. The computer-implemented method of claim 2, wherein:

generating the biometric data comprises conducting facial recognition techniques on the composite image to generate the biometric data; and performing the authentication of the user comprises determining that the biometric data is within a predetermined match threshold of the biometric signature of the user.

6. The computer-implemented method of claim 2, further comprising:

determining a detachable cover ID associated with a detachable cover, wherein the detachable cover is attached to the face covering and houses the first sensor and a communication component;

determining a user device ID associated with the user device; and storing the detachable cover ID and the user device ID with a user profile in a database.

7. The computer-implemented method of claim 6, further comprising:

receiving an indication that the detachable cover was secured to the face covering when the authentication request was received, wherein the indication was received along with the authentication request from the user device; and generating the biometric data in response to receiving the indication that the detachable cover was secured to the face covering.

8. The computer-implemented method of claim 2, wherein:

generating the biometric data comprises conducting audio analysis on voice data received from the first sensor to generate the biometric data; and performing the authentication of the user comprises:

retrieving historical biometric data associated with previously received voice data; and determining, based on a comparison between the biometric data and the historical biometric data, whether the biometric data matches the historical biometric data within a predetermined threshold.

9. One or more non-transitory computer readable media storing instructions that, when executed by one or more processors, cause operations comprising:

storing a biometric signature of a user;

in response to an authentication request:

receiving, via a first device at a face covering, first data related to the user while the user is wearing the face covering; and receiving, via a second device at a user device, second data related to the user;

generating biometric data associated with the user based on (i) the first data received via the first device at the face covering and (ii) the second data received via the second device at the user device;

determining a proximity of a communication component located on the face covering to the user device;

performing authentication of the user based on the biometric data, the biometric signature of the user, and a comparison between the proximity and known proximity data associated with the user, wherein the known proximity data is an average distance between the user device and the face covering determined based on past authentications; and generating a confirmation of a successful authentication of the user based on the authentication of the user.

10. The one or more non-transitory computer readable media of claim 9, further comprising:

determining geospatial data associated with the authentication request;

retrieving historical geospatial data from a user profile associated with the user, wherein the historical geospatial data indicates an angle pattern in which the second data is typically received by a second sensor at the user device;

comparing the geospatial data to the historical geospatial data; and determining to authenticate the user based on the comparison between the geospatial data and the historical geospatial data.

11. The one or more non-transitory computer readable media of claim 9, further comprising:

receiving a first image, wherein the first data includes the first image;

receiving a second image, wherein the second data includes the second image; and combining the first image and the second image to create a composite image.

12. The one or more non-transitory computer readable media of claim 11, wherein:

generating the biometric data comprises conducting facial recognition techniques on the composite image to generate the biometric data; and performing the authentication of the user comprises determining that the biometric data is within a predetermined match threshold of the biometric signature of the user.

13. The one or more non-transitory computer readable media of claim 9, further comprising:

determining a detachable cover ID associated with a detachable cover, wherein the detachable cover is attached to the face covering and houses a first sensor and the communication component;

determining a user device ID associated with the user device; and storing the detachable cover ID and the user device ID with a user profile in a database.

14. The one or more non-transitory computer readable media of claim 13, further comprising:

receiving an indication that the detachable cover was secured to the face covering when the authentication request was received, wherein the indication was received along with the authentication request from the user device; and generating the biometric data in response to receiving the indication that the detachable cover was secured to the face covering.

15. The one or more non-transitory computer readable media of claim 9, wherein:

generating the biometric data comprises conducting an audio analysis on voice data received from the first device to generate the biometric data; and performing the authentication of the user comprises:

retrieving the biometric signature associated with previously received voice data; and determining, based on a comparison between the biometric data and the biometric signature, whether the biometric data matches the biometric signature within a predetermined threshold.

16. One or more non-transitory computer readable media storing instructions that, when executed by one or more processors, cause operations comprising:

storing a biometric signature of a user, in response to an authentication request:

receiving, via a first device at a face covering, first data related to the user while the user is wearing the face covering; and receiving, via a second device at a user device, second data related to the user;

generating biometric data associated with the user based on (i) the first data received via the first device at the face covering and (ii) the second data received via the second device at the user device;

performing authentication of the user based on the biometric data, the biometric signature of the user, and a comparison between geospatial data associated with the authentication request and historical geospatial data from a user profile associated with the user, wherein the historical geospatial data indicates an angle pattern in which the second data is typically received by the second device at the user device; and generating a confirmation of a successful authentication of the user based on the authentication of the user.

17. The one or more non-transitory computer readable media of claim 16, the operations further comprising:

creating a composite image based on the first data and the second data, wherein generating the biometric data comprises generating the biometric data based on the composite image.

18. One or more non-transitory computer readable media storing instructions that, when executed by one or more processors, cause operations comprising:

storing a biometric signature of a user, in response to an authentication request:

receiving, via a first device at a face covering, first data related to the user while the user is wearing the face covering; and receiving, via a second device at a user device, second data related to the user;

generating biometric data associated with the user based on (i) the first data received via the first device at the face covering and (ii) the second data received via the second device at the user device;

performing authentication of the user based on the biometric data and the biometric signature of the user to determine whether to authenticate the user;

in response to determining to authenticate the user, generating a confirmation of a successful authentication of the user;

determining a detachable cover ID associated with a detachable cover, wherein the detachable cover is attached to the face covering and houses a first sensor and a communication component;

determining a user device ID associated with the user device; and storing the detachable cover ID and the user device ID with a user profile in a database.

19. The one or more non-transitory computer readable media of claim 18, the operations further comprising:

receiving an indication that the detachable cover was secured to the face covering when the authentication request was received, wherein the indication was received along with the authentication request from the user device; and generating the biometric data in response to receiving the indication that the detachable cover was secured to the face covering.

20. The one or more non-transitory computer readable media of claim 18, the operations further comprising:

creating a composite image based on the first data and the second data, wherein generating the biometric data comprises generating the biometric data based on the composite image.

\* \* \* \* \*